(12) United States Patent
Gorshing

(10) Patent No.: US 6,572,763 B2
(45) Date of Patent: *Jun. 3, 2003

(54) WASTEWATER SCREENING, WASHING AND DEWATERING SYSTEM

(76) Inventor: Donald B. Gorshing, P.O. Box 612491, South Lake Tahoe, CA (US) 96152

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 1 day.

(21) Appl. No.: 09/374,489
(22) Filed: Aug. 13, 1999

(65) Prior Publication Data
US 2001/0054591 A1 Dec. 27, 2001

Related U.S. Application Data
(60) Provisional application No. 60/097,489, filed on Aug. 21, 1998.

(51) Int. Cl.[7] .................................................. E02B 5/08
(52) U.S. Cl. ........................ 210/159; 210/162; 210/400; 210/407; 210/413; 210/416.1
(58) Field of Search ................................ 210/159, 158, 210/162, 406, 407, 413, 416.1, 400

(56) References Cited

U.S. PATENT DOCUMENTS

| 4,818,402 A | * | 4/1989 | Steiner et al. ............... 210/413 |
| 4,867,879 A | * | 9/1989 | Muller ........................ 210/392 |
| 5,300,225 A | * | 4/1994 | Fischer ....................... 210/391 |
| 5,641,398 A | * | 6/1997 | Huber et al. ................ 210/159 |

* cited by examiner

Primary Examiner—Robert J. Popovics
(74) Attorney, Agent, or Firm—Richard Esty Peterson

(57) ABSTRACT

The present invention is a screening/washing/dewatering system which utilizes a solids handling pump to vacuum solids captured from a contaminated fluid stream from the system's screening mechanism and to convey them, in a concentrated form and through a closed conduit, to the washing/dewatering mechanism. The use of a solids handling pump enables a screening, washing and dewatering system to contain the captured solids in a completely closed system from their point of capture, through a conveyance system of unlimited length and configuration, to the point that the washed, dewatered screenings are finally discharged. Secondarily, the present invention offers the advantages of being able to capture as small of a solids particle size as is desirable and of providing effective washing and dewatering of the captured particles while minimizing the number of moving parts and maximizing the overall system reliability.

10 Claims, 5 Drawing Sheets

WASTEWATER SCREENING, WASHING AND DEWATERING SYSTEM

This application claims the benefit of Provisional Patent Application Ser. No. 60/097,489, filed Aug. 21, 1998.

BACKGROUND OF THE INVENTION

This invention relates primarily to a process and apparatus for screening the intake stream of municipal wastewater treatment plants where the apparatus would be used at the influent to such plants to capture, wash and dewater fibers, plastics, textiles and other solids or objects which could plug, foul or contaminate downstream pumps, treatment equipment or processes.

The presence of undesirable, untreatable solids in municipal wastewater has been a problem ever since centralized treatment plants have been in existence, due to their tendency to clog pumps and foul treatment equipment and processes. These solids typically include plastics, textiles, fibers and other non-degradable, inorganic materials in excess of 0.25" in size. In order to minimize the operational problems created by these materials, there has always been a strong desire for their removal at the inlet to the treatment plants, before they have an opportunity to create operational problems with subsequent equipment and processes.

Early screening devices primarily consist of a series of parallel bars spaced approximately 1' or more apart, commonly referred to as a bar rack, which extended vertically downward to the channel floor. As the wastewater passed between the individual bars of the bar rack, solids which were larger than the spacing between the screen bars were captured on the upstream surface of the bar rack for subsequent removal with a hand rake. At that time, the solids, or screenings, were typically carried away in buckets then buried nearby.

As technology advanced, mechanical devices were developed to automatically rake the captured solids off the bar racks. These devices were most often either a single rake suspended at either end by cables and powered by a reversing winch, or multiple rakes attached at either end to two endless loops of chain which were powered by an electric motor. In the last 15 years, the cables and chains have been replaced by a single rake suspended on long arms from a motor-driven carriage traveling up and down the screen side frames above the influent channel. In all cases, the solids were dragged up the bar rack by the moving rake and deposited into a hopper or onto the concrete floor behind the screen for eventual pick-up and disposal.

Increasingly stringent effluent quality standards for wastewater treatment plants have necessitated the incorporation of more sophisticated treatment processes, which are more prone to malfunction due to plugging or fouling by foreign materials.

Thus, the most recent trend in screening equipment has been toward fine screens to remove any solids larger than ¼ inch from the wastewater stream. These screening mechanisms typically consist of a series of screen panels hinged together end-to-end to form a continuous loop, somewhat like a conveyor belt. The individual panels are comprised of a series of thin parallel bars spaced ¼ inch or more apart and a hinge rod to connect the individual panels together. The entire assembly is positioned vertically in a channel such that the solids entrained in the waste stream are captured on the upstream side of the screen panels as the wastewater passes through the mechanism. The travel of the screen panels causes the captured solids to be conveyed up and out of the channel where they are discharged.

At the same time the benefits of fine screening were being recognized, operators of the landfills where the solids, or screenings, were being deposited began demanding a cleaner, dryer product in order to avoid any potential liability associated with the screenings, should they be considered hazardous materials by the regulating authorities. The two trends were at direct odds in that the fine screens captured significantly more solids with a high water content as well as a large amount of putrescible material, which created both odor problems and potential health risks. In order to accommodate both situations, new machines were developed to wash and dewater the captured screenings. These machines typically incorporate combinations of water sprays, spinning impellers, scrub brushes and reversing screw augers and are quite complex, difficult to maintain and do not produce a clean, dry product.

There are numerous disadvantages to the present fine screening/washing/dewatering systems including:

1. The screening devices incorporate a multitude of articulating joints and rollers which are subject to the abrasive and corrosive elements of the wastewater, resulting in high operation and maintenance costs.
2. The screening mechanism themselves create considerable blockages of channel flow, creating significant head losses across the screen and resulting in higher pumping costs at the plant influent.
3. The need to substantially oversize the screen in order to pass a given amount of flow without exceeding recommended velocities through the screening panels.
4. The difficulty of discharging captured materials from the screen panels, resulting in the solids being "conveyed" past the discharge area and back down into the influent channel to be swept away by the fluid passing through the screen.
5. The accumulation of solids in the mechanical workings of the screening mechanism resulting in mechanical failures and the subsequent need for corrective maintenance.
6. The accumulation of solids on wipers, brushes and cross-members in the discharge area.
7. The spillage of solids onto the floor and other equipment around the screen create safety and health hazards as well as attract nuisance pests such as flies, rodents, etc.
8. The difficulty and expense of accommodating influent channels which are several feet below grade, requiring very tall, costly screens to elevate the screenings to the point of discharge.
9. The susceptibility of damage to the screen drive in deep pits due to flooding.
10. The need to provide some method of screenings conveyance between the screen's discharge and the dumpster or washing/dewatering mechanism, which could be quite difficult and costly, depending on their location.
11. The operating, maintenance and housekeeping problems associated with belt conveyors and screw conveyors used in screenings transfer applications.
12. The complexity and expense of screenings washers and presses which presently incorporate motorized impellers, high pressure water sprays, rotating brushes and reversing augers.

SUMMARY OF THE INVENTION

In the present invention, the liquid to be treated enters the screening mechanism through the upstream end of the device where it is forced to pass through a screen panel before exiting the device through its downstream end. Solids too large to pass through the openings in the screen panel are retained on its upstream surface, from which they are subsequently removed by a vacuum header which traverses the screen panel. The captured solids are drawn into the vacuum header by the suction forces created by a solids handling pump, then pass through the pump and are subsequently discharged through a closed piping system to a washing/dewatering mechanism.

The initial section of the washing/dewatering portion of the invention, later referred to as the washbox, utilizes a series of staggered baffles in a closed chamber to create turbulence in the liquid containing the captured solids as it flows from one end of the chamber to the other, resulting in the degradation of organic materials and the washing of other materials. The outlet of the washing compartment of the device is in direct communication with the inlet of the dewatering aspect of the invention. Here, the captured solids flow into a chamber lined with fine screen panels, whereby the oversized solids are retained on the surface of the panels and the carrying fluid with finer particles passes through for subsequent return to the original channel. The rotating action of a screw auger passing through the dewatering chamber in close proximity to the fine screen panels scrapes the oversized solids from the surface of the fine screen panels and conveys them into and through a closed-sided, open-ended tube forming a compression chamber. Here, the excess liquid is forced out of the solids by the compressive forces created when the rotating auger forces the solids just removed from the screen panels in the dewatering chamber up against previously captured solids passing out of the compression chamber.

It is an object of this invention to provide a simplified screening/washing/dewatering system whereby the total number of moving parts requiring maintenance are minimized and system performance is maximized. It is also an object of this invention to provide a clean, odor-free screening/washing/dewatering system in which the undesirable solids removed from the fluid stream being treated are contained within a closed system from their point of capture, in the treatment plant influent channel, to the point at which the washed and dewatered screenings are discharged to a container for final disposal.

Other objects and advantages are:

To provide a screen panel having an open area of at least 85% to minimize the required size of the screening mechanism, the headloss through the screen, and the resulting capital and operational costs of the screening system.

To provide a positive means of removing the captured screenings from the screen panel and minimize the possibility for screenings carry-over to downstream processes and equipment.

To utilize, preferably, screen panels which are very deep in the direction of fluid flow in order to minimize the tendency of fibrous material to wrap around the individual screen plates and blind the open area of the screen panel.

To utilize a solids handling pump or eductor to create the vacuuming action necessary to draw the captured solids off of the screen panel and into vacuum header and to convey them through a closed pipe to the location of the screenings washing/dewatering device for subsequent processing.

To utilize a closed conduit to convey the screenings from the screening mechanism to wherever the washing/dewatering mechanism is located which could be any distance away, either horizontally or vertically.

To provide the ability to provide a screen panel with openings of less than ¼" for the removal of smaller solids from waste streams without necessitating a change of any other components of the screening/washing/dewatering system.

Other features, advantages, and objects of the present invention will become apparent with reference to the following description and accompanying drawings.

BEST MODE FOR CARRYING OUT THE INVENTION

Figure 1:
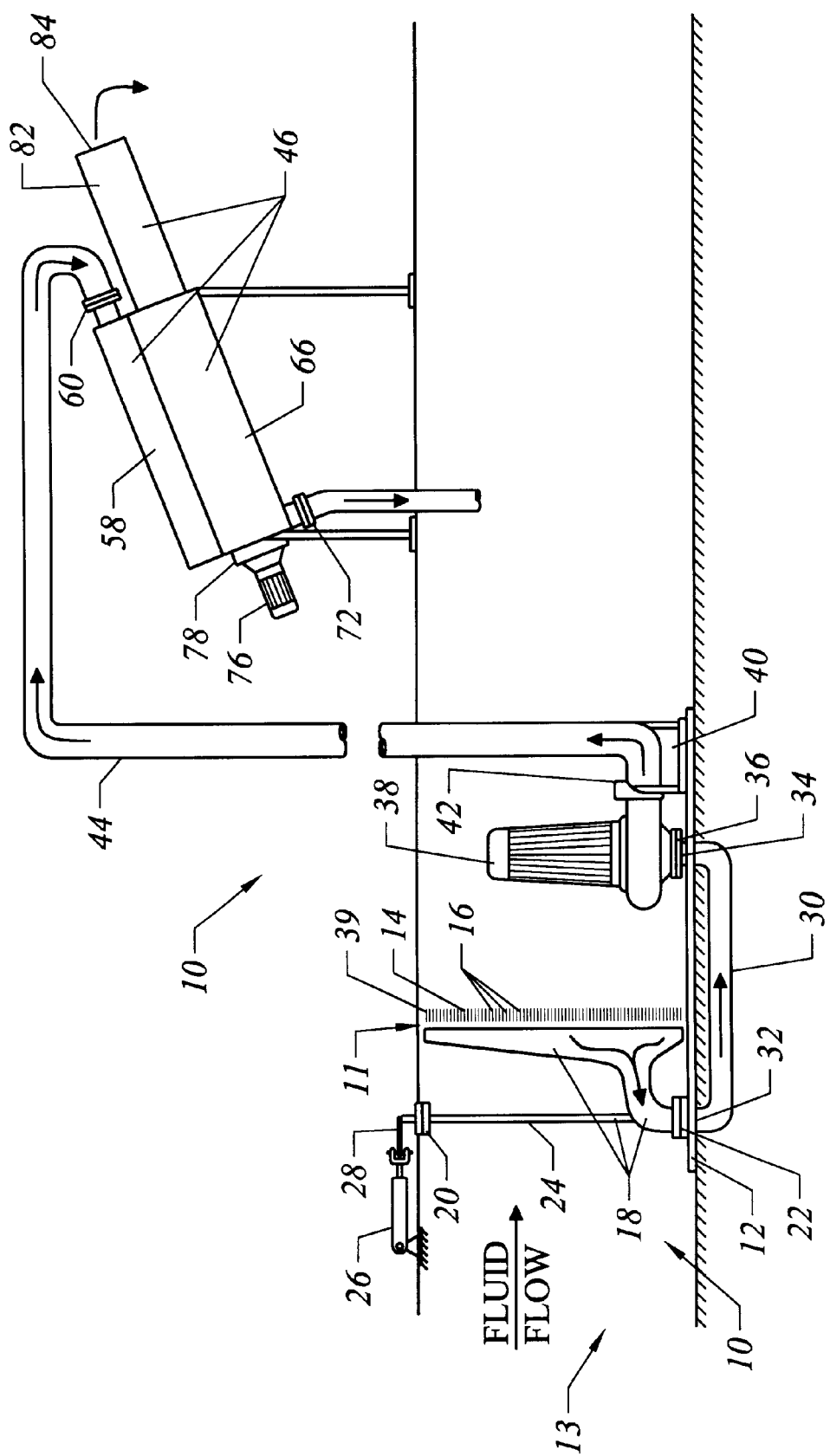
FIG. 1 is a schematic representation of the fixed screen/dynamic vacuum header embodiment of the invention in elevation illustrating the preferred placement of the screening mechanism in the contaminated liquid conveyance conduit or channel, and the interrelationship of the screening mechanism to the washing/dewatering mechanism.

FIG. 1 is a schematic representation of the invention in elevation illustrating the preferred embodiment of the screening and cleaning system 10 with the preferred placement of the screening mechanism 11 in the contaminated liquid conveyance conduit or channel 13, and the interrelationship of the screening mechanism 11 to the washing/dewatering mechanism 15.

The fabricated components of the invention are preferably made of stainless steel to provide adequate strength to support the imposed loads and forces as well as resist the abrasive and corrosive effects of the contaminated fluids being handled. Other materials exhibiting similar characteristics may also be used. Other items, such as pumps and gearmotors, are furnished in their normal materials of construction with protective surface coatings.

Figure 2:
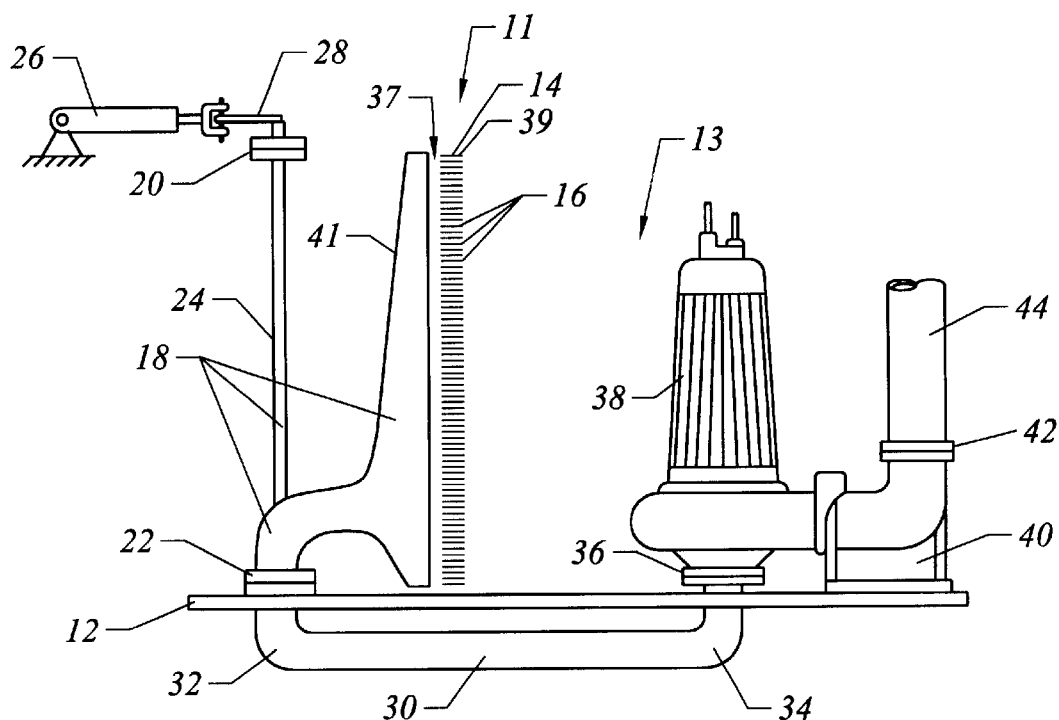
FIG. 2 is a cross-section, in elevation, of one embodiment of the screening mechanism incorporating a stationary screen panel and dynamic vacuum header.
Figure 3:
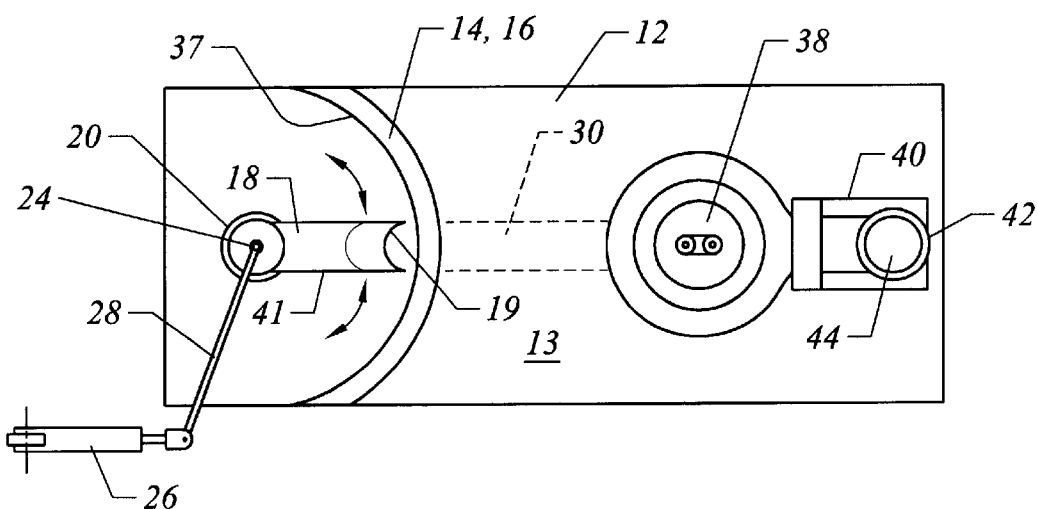
FIG. 3 is an embodiment of the same screening mechanism with the stationary screen panel in plan view.

In FIGS. 2 and 3, a base plate 12 is positioned on the floor of the contaminated liquid conveyance conduit or channel 13 and functions as a support platform for the various components of the screening system 10, including the screen panel assembly 14 with spaced parallel plates 16, the vacuum header assembly 18, a suction generating device such as a solids handling pump 38, and, the interconnecting piping 30 between the solids handling pump 38 and the vacuum header orifice 19 of the vacuum header assembly 18.

The screen panel assembly 14 has a screen panel 39 positioned near the upstream end of the base plate 12. The screen panel 39 is preferably arcuate in configuration with the concave side of the panel facing upstream. The curved plates 16 of the screen panel 39 span the entire width of the conveyance conduit or channel. The height of the screening panel 39 formed by the stack of spaced plates 16 may vary from the full height of the channel to something less than full height to provide emergency overflow capabilities, depending on the application specifics. The screen panel 39 is preferably comprised of a series of closely spaced parallel plates 16 having deep section in the direction of fluid flow to prevent fibrous material from wrapping completely around them and subsequently blinding the screen panel. Alternately, perforated plates, parallel wires or wire mesh materials are used in place of the parallel plates for the screening medium. The materials of construction are corrosion resistant stainless steel, plastics or other materials comparable in strength and durability.

The vacuum header assembly 18 is positioned upstream of the screen panel assembly 14 such that a suction orifice 19 of a vacuum header 41 sweeps within close proximity of the screen panel assembly 14 on an arcuate path as the header pivots from one side of the liquid conveyance channel to the other on pivot bearings 20 and 22. The suction orifice 19 of the vacuum header is positioned proximate the screen panel 39 and is contoured with an elongated slit the height of the screen panel 39 so that the captured solids resting against the screen panel's surface 37 are vigorously pulled into the vacuum header 41 by the suction force created by the solids handling pump 38 and transmitted to the vacuum header 41 by means of the suction piping system 30. The vacuum header 41 is supported by the bearings 20 and 22 located near the top and the bottom of the channel. The upper bearing 20 provides stability to the vacuum header assembly 18 as it rotates about its axis while the lower bearing 22 functions both as a bearing and as a rotating seal to prevent liquid from entering the vacuum header 41 at that point.

The pivoting motion of the vacuum header 41 is caused by a rotative force, preferably created by a hydraulic cylinder 26 acting in conjunction with a lever arm 28 attached to the vacuum header assembly's center support shaft 24. Alternatively, angular displacement is actuated by a pneumatically actuated cylinder, a reversing gearmotor, a hand-operated wheel or lever, or any other device which will produce the desired motion of the vacuum header 41 relative to the screen panel 39.

The vacuum header assembly 18 is in direct communication with the solids handling pump 38 by means of the interconnecting suction piping system 30. The suction piping system 30 is comprised of preferably round piping components having ample cross sectional area and gradual bends and transitions so as to minimize the potential for the solids, or screenings, to become entrapped or entangled in the piping system. Alternatively, the piping system is of a square, rectangular or other cross-sectional shape. The upstream end 32 of the suction piping system 30 culminates at the lower bearing 22 of the vacuum header assembly 18. The downstream end 34 of the suction piping assembly terminates at the intake flange 36 of the solids handling pump 38. A sealing system in the flange 36 is provided at the downstream end 34 of the suction piping system 30 to ensure against leakage at that interface, while allowing the solids handling pump 38 to be removed with minimal effort for inspection and repair.

The solids handling pump 38 is preferably, positioned on the base plate 12 downstream of the screen panel assembly 14, so as to avoid the accumulation of solids on its outside surface. The solids handling pump 38 generates both the suction force necessary to vacuum the captured solids off of the screen panel 39 and the discharge force necessary to turbulently pump the concentrated solids, or screenings, to the washing/dewatering mechanism 15, wherever it is located. Preferably, the solids handling pump 38 is of the submersible type so that it may be located nearby the vacuum header assembly 18 and won't require re-priming each time it operates. However, alternative types of pumping systems may be used so long as they are able to handle the captured screenings without plugging and develop adequate discharge pressure to pump the material to the washing/dewatering mechanism.

The submersible solids handling pump 38 rests on a support base 40, which positions the pump's suction nozzle 43 over the sealing system 36 at the downstream end 34 of the suction piping system 30. The pump support base 40 also functions as the point where the discharge piping system 44 begins. The pump support base is locatable either upstream or downstream of the solids handling pump 38 without consequence.

The discharge piping system 44 connects the solids handling pump 38 to the washing/dewatering mechanism 15 and is comprised of straight lengths of pipe or hose and any number of fittings. The discharge piping system 44 is preferably made up of circular cross-section conduits to provide maximum ability to pass solids and liquids with minimum friction losses and minimum potential for blockages. Alternatively, square, rectangular or other forms of conduits are used.

Figure 4:
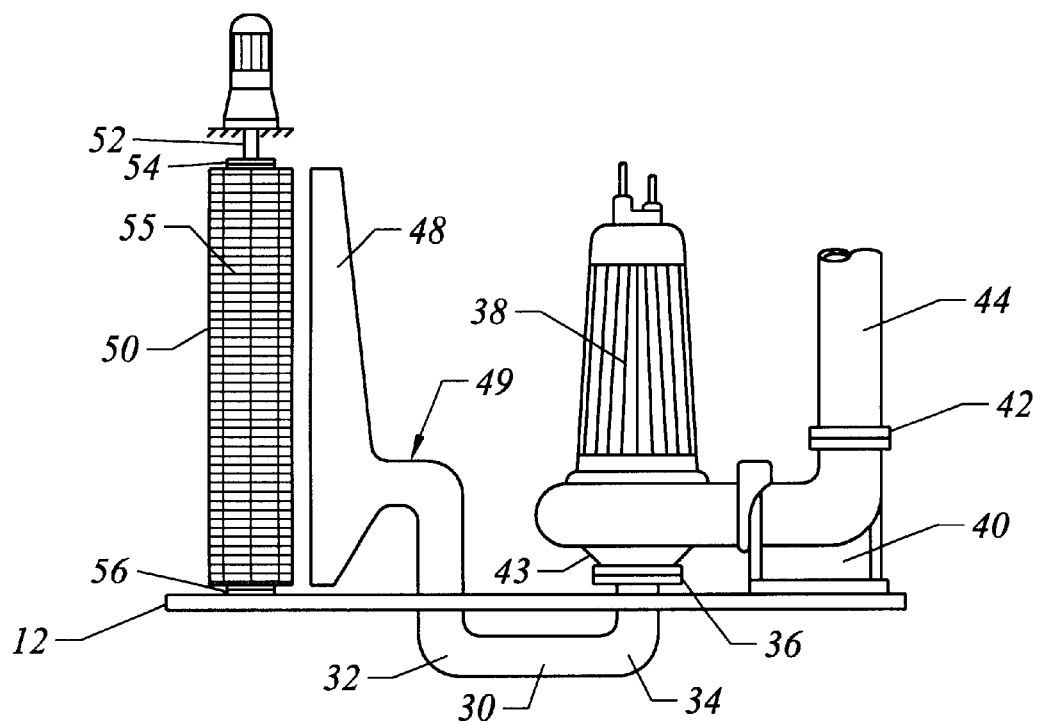
FIG. 4 is a cross-sectional embodiment of an alternate design of the screening mechanism, in elevation, incorporating a dynamic screen panel assembly and a stationary vacuum header.
Figure 5:
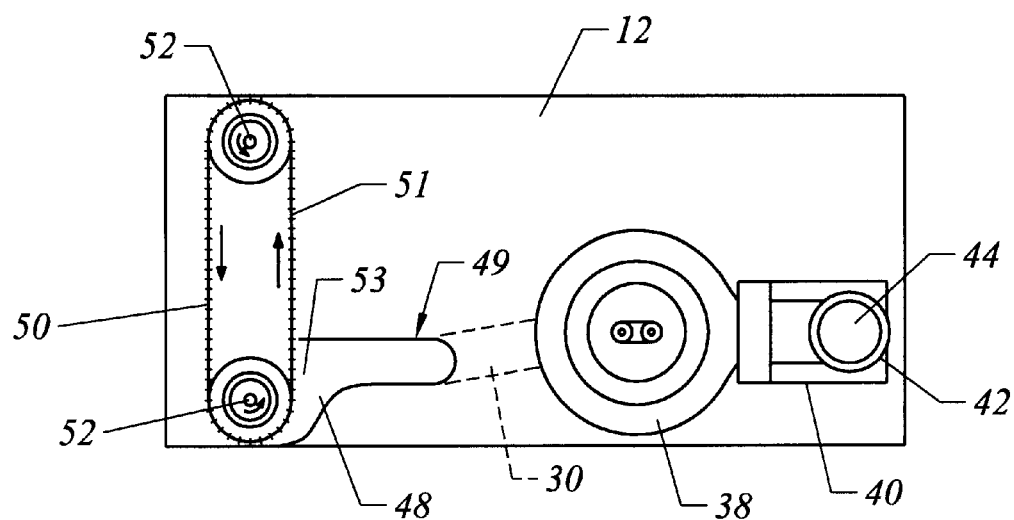
FIG. 5 is an embodiment of the same screening mechanism with the dynamic screen panel assembly in plan.

FIGS. 4 and 5 illustrate an alternate embodiment of the screening mechanism 11 which retains the use of the solids handling pump 38 to create the suction forces in a vacuum header 48 and convey the captured solids to the washing/dewatering mechanism 15. In this embodiment, the vacuum header 48 of the vacuum header assembly 49 is fixed or stationary and a screen panel assembly 50 is dynamic, or moves. The dynamic screen assembly 50 is comprised of a series of screen panels 51 which are hinged together end-to-end to form an endless belt of panels. Alternately, a wire mesh belting or any other flexible open-grid medium or panels constructed of parallel plates, perforated plates, parallel wires, fabric mesh or any other configuration which accomplish the intended purpose of straining solids from a fluid stream are used. The preferred material of construction is stainless steel although other materials of adequate strength and durability is useable.

The dynamic screen assembly 50 is made to wrap around turnshaft assemblies 52 which are located at either side of the channel 13. The turnshaft assemblies 52 are positioned vertically, or near vertically, in the channel and are supported by upper and lower bearings 54 and 56 to enable them to rotate. Rotative power is applied to one or both of the turnshaft assemblies 52, causing the dynamic screen assembly 50 to travel between the turnshaft assemblies 52, much the same as with a conveyor belt. As the screen assembly 50 is conveyed across the width of the channel 13, solids entrained in the contaminated fluid are captured on the upstream face of the screen panels 51 and conveyed to the side of the channel where the stationary vacuum header assembly 49 is positioned.

Preferably, the stationary vacuum header 49 is located near the side of the channel and on the downstream side of the dynamic screen assembly, although it may also be positioned on the upstream side and at any point across the width of the channel. The length of the orifice 53 of vacuum header 48 is positioned perpendicular to the direction of travel of the dynamic screen assembly 50 and extends over the full width of the belt of panels 55.

As before, the vacuum header 48 is in direction communication with the solids handling pump 38 by means of a suction conduit 30. The solids handling pump 38, pump support base 40 and discharge piping system 44 are the same as with the screening mechanism 11 with the stationary screen panel assembly 14 and dynamic vacuum header assembly 18, as described above and as illustrated in FIGS. 2 and 3.

Figure 6:
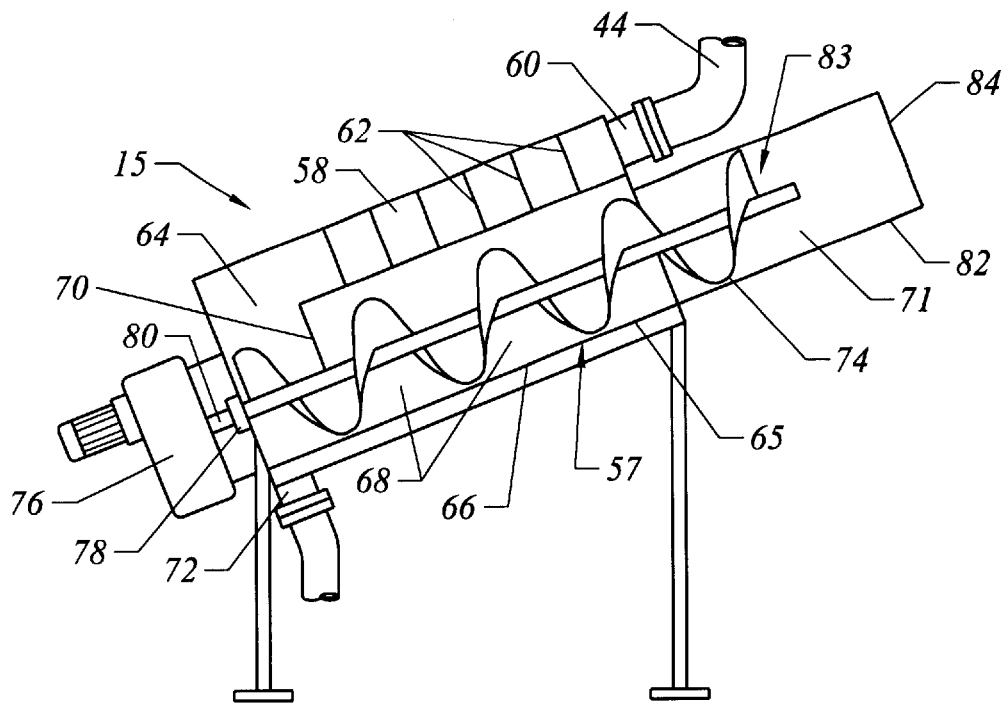
FIG. 6 is a cross-section, in elevation, of one embodiment of the washing/dewatering mechanism incorporating a motorized compaction screw auger.
Figure 7:
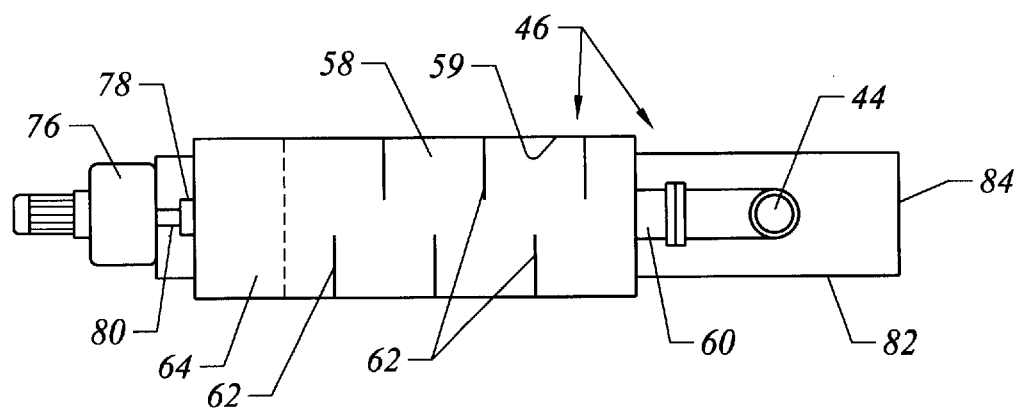
FIG. 7 is a cross-sectional plan view of the same embodiment of the washing/dewatering mechanism incorporating the compaction screw auger.

FIGS. 6 and 7 are embodiments of the washing/dewatering mechanism 15 of the invention which incorporates a mechanically driven screw auger assembly 57. The contaminated fluid from the solids handling pump 38 containing the concentrated screenings enters the washing/dewatering mechanism 15 at the washbox inlet 60. The washbox assembly 58 is comprised of an elongated conduit 59 in which deflectors 62 are positioned at staggered intervals. As the contaminated fluid passes from the inlet end 60 to the outlet end 64 of the washbox, the turbulence created by the deflectors 62 breaks the organic particles down to a size small enough to pass through the fine screens 68 in the subsequent dewatering chamber 66 of the mechanism 15, allowing their return to the channel 13. The deflectors 62 in the washbox preferably extend from the sides (or top and bottom) of the conduit 59 to its approximate center, but are configured in any other pattern which will create the desired turbulence in the contaminated fluid. The deflectors 62 are preferably made from solid plates, although rods, bars or other configurations useable.

The outlet end 64 of the washbox is in direct communication with the inlet 70 to the dewatering chamber 66 of the mechanism 15 such that the solids-laden fluid exiting the washbox is directed through the inlet 70 and into the dewatering chamber 66. The dewatering chamber 66 is lined with fine screens 68, through which the contaminated fluid and small particles pass to exit the washing/dewatering mechanism 15 for return to the channel 13 via the drain port outlet 72. The size of the openings in the fine screens 68 varies and is dependent on the nature of the solids being processed and the desires of the user. The fine screens 68 are preferably manufactured in panels 65 from perforated plate but screens constructed from parallel wire panels, wire mesh or similar materials are appropriate.

The fine screen panels 65 are formed and oriented such that at least a portion of their surface is in close proximity to the flights of a rotating screw auger 74. The captured solids which are too large to pass through openings in the fine screen panels 65 are then scraped off the surface of the panels by the rotating action of the screw auger 74 and conveyed from the dewatering chamber 66 into a compaction chamber 71 formed by a compaction tube 82 of the washing/dewatering mechanism 15. The rotational force on the screw auger 74 is created by a gearmotor drive 76 mounted externally to the washing/dewatering mechanism. A sealing mechanism 78 is provided at the screw auger drive shaft 80 to prevent leakage of the contaminated fluid from inside the washing/dewatering mechanism 15.

The compaction tube 82 of the washing/dewatering mechanism 15 is a closed-sided conduit into which the screw auger 74 extends but does not pass completely through. The solids exiting the discharge end 83 of the screw auger 74 form a plug at the end 84 of the compaction tube 82, against which subsequent solids are pressed as the screw auger 74 continues to convey new solids out of the dewatering chamber 66 and into the compaction chamber 71. This pressing action causes excess free moisture to be squeezed out of the solids while, at the same time, presses the plug forward in the tube, resulting in the discharge of a portion of the compacted solids as they are pressed out of the discharge end 84 of the compaction tube.

Figure 8A:
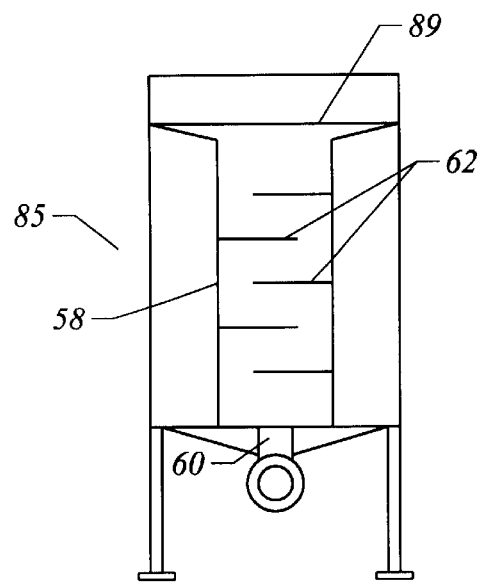
FIG. 8A is a cross-section, in elevation from the back of another embodiment of the washing/dewatering system utilizing a static screen for dewatering.
Figure 8B:
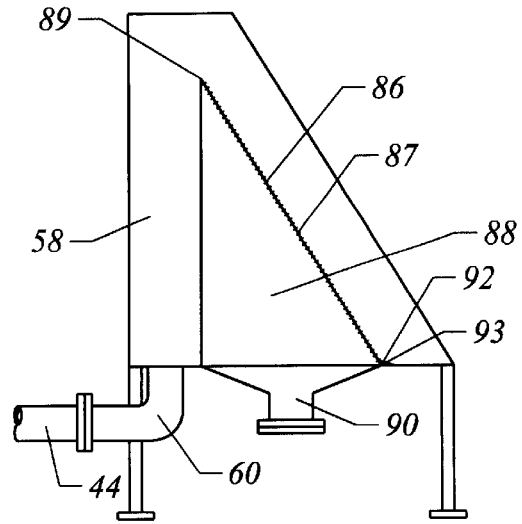
FIG. 8B is a cross-section, in elevation from the side of the embodiment of the washing/dewatering system of FIG. 8A.
Figure 9:
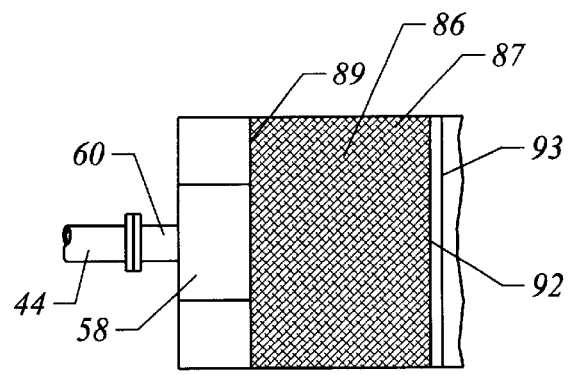
FIG. 9 is a plan view of the same embodiment of the washing/dewatering system utilizing a static screen.

FIGS. 8A–8B and 9 are representatives of an alternative washing/dewatering mechanism 85 which makes use of an inclined dewatering deck 86 to remove the excess water and fine particles from the captured solids, instead of the compaction screw auger assembly 57 illustrated in FIGS. 6 and 7.

In FIGS. 8A–8B and 9, a washbox assembly 58 similar to that discussed above is positioned upstream of the inclined dewatering deck 86. The inclined dewatering deck 86 is comprised of a perforated plate 87, or alternately a parallel wire screen panel or something similar, placed in an inclined position and situated with a drainage box 88 on its underside to collect the fluid separated from the larger solids for return to the channel 13 via its outlet port 90.

The solids-laden fluid exiting the washbox assembly 58 is caused to spill over the highest edge 89 of the inclined dewatering deck 86 and flow downward, by gravity, across the perforated plate 87. As this happens, the carrying fluid and smaller particles fall through openings in the perforated plate 87 where they are collected in the drainage box 88 before passing out of the device and back to the channel via drain pipe 90. The solids in the fluid which are too large to pass through the openings in the inclined drainage deck 86 slide by gravity to the lower edge 92 of the deck, continually loosing additional free water as they go, until they finally fall of the deck's discharge lip 93 and into a receptacle (not shown) for disposal.

FIG. 1 provides a general representation of the invention and the preferred orientation of the screening mechanism 11 in the contaminated liquid conveyance conduit or channel 13, and of the interrelationship of the screening mechanism to the washing/dewatering mechanism 15. Operationally, the contaminated fluid typically enters the treatment facility in an open top channel 13. The invention's screening mechanism 11 is positioned in this channel 13 such that any oversized objects or solids are captured as the contaminated fluid passes through the screening means. As the captured solids continue to accumulate, the open area through the screening means diminishes and the resulting damming effect creates a differential level across the screening means which is proportional to the degree of blinding. When this differential level reaches a predetermined maximum, the screening, washing/dewatering system is activated, by either an automated control system or manually, and the screen cleaning cycle begins.

In FIGS. 2 and 3, the oversized solids entrained in the contaminated fluid stream are captured on the upstream surface of the screen panel assembly 14 as the fluid passes through. The vacuum header assembly 18 traverse back and forth across the width of the channel with its vacuum header 49 in close proximity to the upstream surface of the screen panel 39. The traversing motion of the vacuum header 49 is created by the extension and retraction of a hydraulic cylinder 26 acting on a lever 28 affixed to the center support shaft 24 of the vacuum header assembly 18.

The suction forces created by the solids handling pump 38 are transmitted to the vacuum header assembly 18 through a suction piping system 30. The resulting vacuuming action created by the suction forces of the solids handling pump 38 are used to remove the captured solids from the screen panel 39, draw them through the pump and then deliver them, in concentrated form, to the washing/dewatering mechanism 15 by means of a discharge piping system 44.

FIGS. 4 and 5 illustrate a variation of the screening/vacuum header arrangement which may be more practical for larger channels, but still making use of the same operational principal. In this embodiment, the screening means is, in effect, an open-grid conveyor belt which is placed vertically in the channel 13 and configured to span the width of the channel 13. As the oversized solids entrained in the contaminated fluid are captured on the surface of the dynamic screen assembly 50, the rotational motion of the dynamic screen assembly causes the captured solids to be conveyed to the side of the channel. A stationary vacuum header assembly 49 is positioned near the side of the channel and in near proximity to the surface of the dynamic screen assembly 50 such that the suction forces of the solids handling pump 38 transmitted to the vacuum header assembly 49 by means of the suction piping system 30 causes the captured solids to be drawn off of the screen panels 51 of dynamic screen assembly 50 into the vacuum header 48, and into the solids handling pump 38, from which they are conveyed to the washing/dewatering mechanism 15 by means of the discharge piping system 44.

FIGS. 6 and 7 are embodiments of the invention's washing/dewatering mechanism 15 utilizing a screw auger assembly 57 for compaction. Here, the captured screenings received from the solids handling pump 38, by means of the discharge piping system 44, pass directly into the washing/dewatering mechanism's washbox assembly 58. The turbulence created by the deflectors 62 as the solids-laden fluid passes through the washbox causes the putrescible solids to physically degrade in size, and the release of entrapped organics from other inorganic solids.

The solids-laden fluid leaves the washbox and enters the dewatering chamber 66, where it is exposed to a large surface area of fine screens 68. There the carrying fluid, smaller organics and putrescible particles pass through the openings in the fine screens 68 and drain back to the original channel 13 for subsequent processing in the treatment plant. The solids which are too large to pass through the openings in the fine screens are retained on their surface, from which they are scraped by a screw auger 74, which passes in close proximity to the surface of the fine screen panels 65. The screw auger 74 is powered by a gearmotor drive 76 mounted externally to the washing/dewatering mechanism.

The rotative motion of the screw auger 74 causes the solids to be conveyed out of the dewatering chamber 66 and into the washing/dewatering mechanism's compaction chamber 71, where the screw auger's motion causes them to be pressed against preceding solids which are continually being discharged from the compaction tube 82 as new solids are introduced into the compaction tube 82. This pressing force results in the removal of the remaining free moisture from the solids prior to their being discharged to a receptacle for disposal.

FIGS. 8A–8B and 9 are representatives of the alternative washing/dewatering mechanism 85 for the captured screenings. In this instance, the solids-laden fluid exiting the washbox assembly 58 is passed over an inclined static screen deck 86 to accomplish the removal of excess fluid and small solid particles. As the fluid flows down the inclined deck, the fluid and small particles pass through the small openings in the deck, where they are captured in a drainage box 88 and directed back to the channel 13 by means of a drainage pipeline 90. The solids too large to pass through the openings in the inclined deck 86 are retained on its surface and slide, by gravitational forces, to the bottom 92 of the deck 86 where they fall off into a receptacle for disposal.

Thus the reader will see that the screening and washing/dewatering mechanisms of the invention provide a simpler, more reliable means for removing undesirable solids from liquids while providing greater application versatility and lower capital and operating costs.

While my above description contains many specificities, these should not be construed as limitations on the scope of the invention, but rather as an exemplification of preferred embodiments thereof. Many other variations are possible. For example, the vacuum header assemblies 18 and 38 and the screen assemblies 14 and 50 may be positioned horizontally in the channel as opposed to the vertical orientations illustrated in FIGS. 2, 3, 4 and 5. In addition, a self-priming pump, a grinder pump or a chopper pump may be used instead of the submersible solids handling pump 38 illustrated in FIGS. 1, 2, 3, 4 and 5. Conversely, an eductor system may be used in place of the pump to create similar suction forces at the vacuum header. Numerous methods are available to control the operation of the invention, ranging from strictly manual in nature to totally automatic, all of which are applicable to the invention.

Accordingly, the scope of the invention should be determined not by the embodiments illustrated, but by the appended claims and their legal equivalents.

What is claimed is:

1. In a wastewater treatment system having an open wastewater channel containing a wastewater stream with solid matter in the form of a particle mixture of non-degradable, inorganic matter and degradable organic putrescible matter, wherein the improvement comprises:

a liquid screening mechanism for removing solid matter in excess of a predetermined size from the wastewater stream in the open wastewater channel, the liquid screening mechanism, including:

a screen member immersed in the wastewater stream across the open channel, the screen member having a screen surface that captures solid matter in excess of a predetermined size from the wastewater stream and passes solids smaller than such predetermined size;

a vacuum assembly with a vacuum header having an elongated, vertical suction orifice wholly immersed in the wastewater stream positioned proximate the screen member and displaced from the screen surface on which solid matter in excess of said predetermined size is captured, wherein the vacuum assembly includes a pivotal mounting pivotally mounting the vacuum header relative the screen member, and a suction generating pump connected to the vacuum header that generates a liquid suction at the suction orifice, the suction generating pump having a liquid discharge; and a displacement mechanism for displacing the vacuum header wherein the displacement mechanism includes an actuator connected to the pivotal mounting structure that pivots the vacuum header, wherein the suction orifice when immersed in the wastewater stream and displaced from the screen surface sweeps horizontally across the screen surface in a hack and forth motion and pulls liquid from the wastewater stream and solid matter captured on the screen surface into the vacuum header and wherein the liquid and solid matter are transported from the wastewater stream and discharged from the discharge of the suction generating pump.

2. The wastewater treatment system of claim 1 wherein the screen member of the fluid screening mechanism is an arcuate panel having curved parallel, spaced plates that extend across the wastewater stream.

3. The liquid screening mechanism of claim 1 in combination with a washing and dewatering mechanism comprising:
- a receptacle having a liquid and solid matter input wherein the discharge of the suction generating pump is connected to the input of the receptacle;
- a liquid and solid matter agitating means for degrading putrescible, organic matter into smaller particle matter screenable from the non-degradable, inorganic matter, and,
- a liquid separation device connected to the receptacle wherein the liquid separation device separates the liquid from the solid matter discharged to the receptacle.

4. The liquid screening mechanism of claim 3 wherein the receptacle includes turbulence generating elements wherein the particle mixture is agitated and putrescible, organic matter is degraded.

5. The liquid screening mechanism of claim 4 wherein the receptacle has a conduit and the turbulence generating elements comprise deflectors.

6. The liquid screening mechanism of claim 3 wherein the liquid separation device comprises a screw auger assembly with a conduit having a liquid separation chamber with screens and a compaction chamber with a discharge end.

7. The liquid screening mechanism of claim 3 including a conduit wherein the suction generating pump is connected to the conduit for discharge of the liquid and solid matter at a location remote from the vacuum assembly.

8. In a wastewater treatment system having an open wastewater channel containing a wastewater stream with solid matter in the form of a particle mixture of non-degradable, inorganic matter and degradable organic putrescible matter and a screen immersed in the wastewater stream across the open wastewater channel, the screen having screen openings of at least one-quarter inch in size, wherein the improvement includes a system for removing solid matter accumulating on the surface of the screen in the wastewater stream in the open wastewater channel, the improvement comprising:
- a vacuum head immersed in the wastewater stream having an elongated vertical suction orifice wholly immersed in the wastewater system positioned proximate to and displaced from the surface of the screen;
- pumping means for generating liquid suction forces at the suction orifice of the vacuum head; and
- displacement means for moving the vacuum head horizontally across the surface of the screen in a back and forth motion with the suction orifice in close proximity to the surface of the screen, wherein the displacement means includes a pivotal mounting structure pivotally mounting the vacuum head relative to the screen and an actuator connected to the pivotal mounting structure that pivots the vacuum head, wherein liquid and solid matter accumulated on the screen are drawn into the vacuum head by the pumping means.

9. The wastewater treatment system of claim 8 wherein the pumping means for generating a liquid suction has a discharge wherein the cleaning system includes means for separating the liquid from the liquid and solid matter drawn into the vacuum head and discharged by the liquid suction discharge.

10. The wastewater cleaning system of claim 9 wherein the solid matter has larger particles and smaller particles and wherein the means for separating the liquid from the liquid and solid matter drawn into the vacuum head includes turbulence generating means for washing smaller particles from the larger particles in the solid matter.

\* \* \* \* \*